3,080,331
INSULATING VARNISH INCLUDING AN OIL-MODIFIED ALKYD RESIN AND AN OIL SOLUBLE PHENOL-FORMALDEHYDE RESIN
Raymond H. Thielking, Schenectady, N.Y., assignor, by mesne assignments, to Schenectady Chemicals, Inc., a corporation of New York
No Drawing. Filed Nov. 12, 1957, Ser. No. 695,484
12 Claims. (Cl. 260—20)

This invention relates to oil-modified alkyd resins and insulating varnishes containing such resins.

Ordinary phthalic anhydride alkyds are not suitable for use as insulating varnishes because at the slightly elevated temperatures to which all insulating varnishes are subject, glyceryl phthalate disassociates into glycerine and phthalic anhydride to some extent. The small amounts of glycerol and phthalic anhydride are deposited throughout the film. These compounds not only destroy insulating resistance but actually attract moisture, especially in a humid atmosphere. This further degrades the electrical characteristics of the film.

Accordingly, it is an object of the present invention to prepare insulating varnishes having superior properties to insulating varnishes prepared from oil-modified phthalic anhydride alkyd resins, and, in particular, varnishes yielding conductor coatings having improved electrical permanence and improved permanence of flexibility.

Another object is to prepare novel oil-modified isophthalic and terephthalic alkyd resins.

An additional object is to prepare insulating varnishes containing such isophthalic and terephthalic resins.

A still further object is to devise improved procedures for forming oil-modified isophthalic and terephthalic alkyd resins.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that short oil alkyd resins can be prepared from isophthalic acid and terephthalic acid, and such alkyd resins can be made into outstanding insulating varnishes containing oil-soluble phenol-formaldehyde resins. The oil length of the resin can be between 35 and 60 calculated as tri-glyceride. In general, the shorter the oil length of the resin, the better is the bonding strength to the conductor.

There are no serious problems in preparing isophthalic and terephthalic alkyd resins of long oil length, e.g., 70 or higher. However, difficulties are encountered when an attempt is made to prepare short oil alkyd resins from isophthalic acid or terephthalic acid, e.g., by reacting soybean oil, glycerine and the free acid. Generally, a gel is formed before a satisfactory resin is formed. The lower the oil length, the more readily the gel formation, and the greater the difficulty in preparing a satisfactory resin. If the isophthalic acid or terephthalic acid is replaced by the corresponding dialkyl phthalate, e.g., dimethyl isophthalate, a low molecular weight resin is formed, but it is impossible to cure the resin. It has now been found that if a mixture of isophthalic acid or terephthalic acid with the corresponding dialkyl ester is used as the source of the dibasic acid, then it is possible to prepare short oil alkyd resins, e.g., 35 to 60 oil length, which do not gel and which cure satisfactorily.

It is particularly surprising that oil-modified isophthalic and terephthalic alkyd resins of oil length of 45 and below, e.g., as low as 35, can be prepared. The proportion of dialkyl ester admixed with the free isophthalic acid or terephthalic acid varies, depending on the oil length desired in the resin. With isophthalic acid the minimum amount of dialkyl isophthalate, e.g., dimethyl isophthalate, required varies from 10 mol percent for an oil length of 45 to 15 mol percent for an oil length of 35, based on the total mols of isophthalic acid and dialkyl ester thereof. Above an oil length of 55 there is no need to add dialkyl isophthalate. With terephthalic acid the minimum amount of dialkyl terephthalate, e.g., dimethyl terephthalate, required varies from 10 mol percent of an oil length of 60 to 20 mol percent for an oil length of 35, based on the total mols of terephthalic acid and dialkyl ester thereof. The maximum amount of dialkyl isophthalate or dialkyl terephthalate is 30 mol percent regardless of oil length since above this proportion of dialkyl ester the bonding strength suffers and there is unsatisfactory cure.

It is also possible to prepare short oil alkyd resins by using mixtures of isophthalic acid and terephthalic acid in place of the individual acids. In preparing such mixed resins it is also important to use the proper amount of dialkyl ester as set forth above. Additionally, in place of the drying oil there can be employed the corresponding acids with additional amounts of glycerine, e.g., in place of soybean oil, a semi-drying oil, there can be used linoleic acid with glycerine or a mixture of linoleic acid, palmitic acid, stearic acid, oleic acid, arachidic acid and lignoceric acid in the proportions their glycerides occur in soybean oil together with sufficient additional glycerine to esterify these monobasic acids, as well as the isophthalic acid or terephthalic acid.

In general, sufficient glycerine is added to insure substantially complete esterification of the isophthalic acid or terephthalic acid and complete ester interchange of the dialkyl ester. The preferred dialkyl esters to use are dimethyl isophthalate and dimethyl terephthalate. However, higher dialkyl esters can be used, such as dibutyl terephthalate, dibutyl isophthalate, diethyl isophthalate, dioctyl isophthalate and dioctyl terephthalate.

As the oil there can be used drying and semi-drying oils, such as linseed oil, tung oil, soybean oil, sunflower oil, safflower oil, walnut oil, corn oil, oiticica oil, perilla oil, cottonseed oil, etc. The preferred oil is cottonseed oil. Generally, the reaction between the oil and the isophthalic acid or terephthalic acid is continued until the acid number is less than 50 and preferably below 35. Generally, sufficient glycerine is added to the reaction mixture to insure an excess of 20 to 40 equivalent percent of glycerine over the isophthalic or terephthalic component.

In preparing the insulating varnishes of the present invention, in addition to the short oil (35 to 60 oil length) isophthalic or terephthalic alkyd resin, there is normally used an oil-soluble phenol-aldehyde resin. The phenol-aldehyde resin gives the varnish heat reactivity, helps the electrical properties, aids in the cure and lends hardness and abrasion resistance to the film. Among the oil-soluble phenol-aldehyde resins which can be used are p-tertiary amylphenol-formaldehyde, p-tertiary butylphenol-formaldehyde, p-tertiary octylphenol-formaldehyde, p-phenylphenol-formaldehyde, 2,2-bis(p-hydroxyphenyl) propane formaldehyde and o-tertiary butylphenol-formaldehyde. Other suitable phenol-formaldehyde resins are shown in Honel Patent 1,800,296. Mixed phenols can also be used in forming the oil-soluble phenolic resin. While the phenolic resin can be prepared using acid catalysts, they are generally prepared using alkaline catalysts as is well known in the art. Thus, the p-tertiary butylphenol-formaldehyde resin employed in the following examples was prepared by the alkaline (NaOH) catalyzed reaction of 1 mol of the phenol with 1.5 mols of formaldehyde. A typical example of a mixed phenolic resin which can be used is the alkaline (NaOH) catalyzed reaction product of 0.75 mol of p-tertiary butylphenol and 0.25 mol of bisphenol A with 1.5 mols of formaldehyde. The oil-soluble phenol-formaldehyde resins are of the heat-reactive type. The oil-soluble phenol-formaldehyde resin is usually employed in an amount of 15% to 80% of the total of the short oil alkyd resin and phenolic resin. Increasing the amount of phenolic resin speeds the cure but also sacrifices the aging characteristics. Hence, the amount of phenolic resin is preferably kept at about 20%. It is also possible to eliminate the phenolic resin from the varnish with resulting loss of the advantages from having the phenolic resin present. It is also possible to replace part of the phenolic resin with other heat-reactive resins, e.g., urea-formaldehyde, melamine-formaldehyde and epoxy resins, e.g., bisphenol A-epichlorhydrin resin, although the preferred heat-reactive resins are the phenolic resin since they impart the best combination of improved properties, all things considered.

In addition to the resin components, the insulating varnish also includes one or more solvents, such as xylene, mineral spirits, isophorone, naphtha, toluene, etc.

In the following examples and throughout the specification and claims, unless otherwise stated, all parts and percentages are by weight.

The insulating varnishes of the instant invention have properties which warrant their use at class B temperatures. They can withstand hot spot temperatures as high as 150° C. for the normal life of a motor or transformer to which they are applied. The cured varnishes are highly resistant to oil, chemicals and moisture.

The varnishes in accelerated aging tests have retained their toughness, flexibility, excellent bonding strength and high dielectric properties after heat aging, in some instances, as long as 2500 hours at 200° C. The varnishes can be applied by vacuum impregnation or free dip system. They cure readily under infrared heat or in forced air ovens. Baking is normally done at 375° F. to 400° F., although lower temperatures can be used.

The varnishes are particularly valuable for impregnation of armature and field coils of motors and for both power and distribution transformers of either the oil or dry type where long life at high operating temperatures is required. The varnishes provide maximum penetration in the tightest wound coils.

EXAMPLE 1

878 grams of soybean oil were heated with 176 grams of glycerine and 0.4 gram of litharge as a catalyst at 480° F. to 500° F. for 1 hour. The mixture was cooled to 420° F. and there was added 1008 grams of isophthalic acid, 508 grams of glycerine and 200 grams of isophorone to act as a solvent during the cooking. The mixture was then cooked at 420° F. for 4 hours to an acid number of 32. The mixture was cooled to room temperature and xylene added to thin the batch to 45% solids. The soybean oil-alkyd resin produced had an oil length of 35.

EXAMPLE 2

The short oil alkyd of Example 1 was blended with 550 grams of p-tertiary butylphenol-formaldhyde resin and diluted to 45% solids with xylene.

EXAMPLE 3

Example 2 was repeated replacing the 550 grams of p-tertiary butylphenol-formaldehyde resin by an equal weight of the mixed p-tertiary butylphenol-bisphenol A-formaldehyde resin previously described. The results obtained were similar to those in Example 2.

EXAMPLE 4

An alcoholysis reaction was carried out by heating 9500 pounds of soybean oil, 1900 pounds of glycerine and 3.4 pounds of litharge at 480° F. to 500° F. for 1 hour. The temperature was dropped to 420° F. and there was added 2840 pounds of glycerine, 1105 pounds of dimethyl isophthalate, 8600 pounds of isophthalic acid and 1700 pounds of isophorone. The mixture was held at 420° F. until the viscosity was T (Gardner-Holdt) at 50% solids in ¼ xylene and ¾ No. 52 naphtha and the acid number was 25 to 30. There were then added 5000 pounds xylene, 15,000 pounds of No. 52 naphtha and 5,500 pounds of p-tertiary butylphenol-formaldehyde resin to produce the final insulating varnish. The oil-modified isophthalic alkyd of this example had an oil length of about 40. The varnish prepared in this example was suitable for impregnating motor stators, rotors and other electrical equipment.

EXAMPLE 5

An alcoholysis reaction was carried out by heating 1100 pounds of soybean oil, 290 pounds of glycerine and 0.2 pound of litharge at 480° F. to 500° F. for 1 hour. There was then added 624 pounds of isophthalic acid and 120 pounds of xylene. The temperature was then held at 450° F. until the viscosity was U–V in No. 52 naphtha and the acid number was 5 to 10. The oil-modified isophthalic alkyd thus prepared had an oil length of about 56. There was then added 1750 pounds of No. 52 naphtha and 460 pounds of p-tertiary butylphenol-formaldehyde resin to produce the finished varnish.

EXAMPLE 6

Another batch of the same isophthalic alkyd having an oil length of 56 was made by heating 1100 pounds of soybean oil, 29 pounds of glycerine and 0.2 pound of litharge at 480° F. to 500° F. for 1 hour. There was then added 624 pounds of isophthalic acid and 120 pounds of xylene and heating was continued at 450° F. until the viscosity was U–V (Gardner-Holdt) in No. 52 naphtha and the acid number was about 8. There was then added 2211 pounds of mineral spirits and 467 pounds of p-tertiary butylphenol-formaldehyde resin to produce the finished varnish. The varnish of this example was comparable in properties to the varnish of Example 5. A motor stator was impregnated with the varnish of Example 6 in a dip tank operation. Final cure of the varnish was then effected by baking in an oven for 1 hour at 395° F.

EXAMPLE 7

Example 6 was repeated but in place of adding 2211 pounds of mineral spirits and 467 of the phenolic resin to the oil-modified alkyd resin there was added 6052 pounds of the p-tertiary butylphenol formaldehyde resin and 5421 pounds of mineral spirits to produce a varnish having 60% solids with 75% of the solids being phenolic resin and the balance the oil-modified isophthalic alkyd resin. It has been found that in general, as the amount of phenolic resin increases, the hardness is enhanced, the heat reactivity becomes faster, but the elasticity of the film formed from the varnish decreases. The results with varying proportions of phenolic resin utilizing the 56 oil length isophthalic alkyd resin of Examples 6 and 7 are shown in the following table. In the compositions of the table the solvent was mineral spirits, the term "butyl" stands for the p-tertiary butylphenol-formaldehyde resin previously described, and the term "bisphenol" stands for the bisphenol A modified p-tertiary butylphenol-formaldehyde resin also described previously.

The results are shown in Table II. The oil-modified phenolic varnish was a commercial soybean oil p-tertiary butylphenol-formaldehyde resin varnish. The phthalic anhydride alkyd varnish was a varnish from a soybean oil-modified phthalic anhydride-glycerine alkyd.

*Table I*

| Resin Mixture | Viscosity #4 Ford Cup at 77° F. | Specific Gravity at 77° F. | Non-volatile by Weight (percent) | Percent Isophthalic Alkyd in the Solids | Percent Phenolic Resin in the Solids | Dielectric Breakdown, VPM | Dielectric Breakdown After Soaking in Water 24 Hours, VPM |
|---|---|---|---|---|---|---|---|
| A | 74 | 0.894 | 50 | 80 | 20 butyl | 1,863 | 1,096 |
| B | 52 | 0.892 | 50 | 67 | 33 butyl | 2,954 | 2,053 |
| C | 42 | 0.892 | 50 | 57 | 43 butyl | 2,489 | 1,415 |
| D | 38 | 0.892 | 50 | 50 | 50 butyl | 2,580 | 1,091 |
| E | 130 | 0.932 | 60 | 40 | 60 butyl | 2,700 | 1,150 |
| F | 86 | 0.934 | 50 | 40 | 60 bisphenol | 2,800 | 1,600 |
| G | 130 | 0.932 | 60 | 25 | 75 butyl | 2,600 | 1,450 |

EXAMPLE 8

To make a soybean oil alkyd at 55% oil length with terephthalic acid, 10% of the acid must be replaced by a dialkyl terephthalate, preferably dimethyl terephthalate. Thus, in the alcoholysis stage 650 pounds of soybean oil, 130 pounds of glycerine and 0.2 pound of litharge were heated at 480° F. to 500° F. for 1 hour. Then 34 pounds of glycerine, 324 pounds of terephthalic acid, 42 pounds of dimethyl terephthalate and 100 pounds of isophorone were added and the mixture held at 480° F. until the acid number was 10 and the viscosity was T–V at 50% in mineral spirits. There were then added 1400 pounds of mineral spirits and 200 pounds of the p-tertiary butylphenol-formaldehyde resin to make the finished insulating varnish containing the 55 oil length terephthalic alkyd. This varnish was used to coat copper wire, motor rotors, etc.

EXAMPLE 9

In order to make a soybean oil alkyd at 45% oil length with terephthalic acid, 20% of the acid should be replaced by dimethyl terephthalate. Specifically, 42 pounds of soybean oil was heated with 130 pounds of glycerine and 0.2 pound of litharge at 480° F. to 500° F. for 1 hour. Then there were added 34 pounds of glycerine, 288 pounds of terephthalic acid, 84 pounds of dimethyl terephthalate and 100 pounds of isophorone and the mixture was held at 460° F. until the viscosity was Gardner-Holdt tube I at 50% in xylene. There were then added 850 pounds of xylene and 200 pounds of the p-tertiary butylphenol-formaldehyde resin to form the finished varnish.

To demonstrate the resistance to thermal degradation at elevated temperatures of the novel resin combinations of the instant invention, the following electrical and mechanical tests were made.

*Twisted pairs.*—No. 18 enameled magnet wire was twisted 9 twists in 4.75 inch lengths using a 3 pound tension on the pairs. There were then applied two coats of varnish reverse dip and each coat was cured. The specimens were aged at 200° C. and 2000 volts electric pressure were applied from time to time until failure occurred.

*Coated glass cloth.*—3 mil glass cloth was given two coats of varnish reverse dip and cured between coats. The coated cloth was aged at 200° C. and 1000 volts electric pressure was applied from time to time between electrodes on each side of the cloth until failure occurred.

*Copper strip aging.*—Two coats of the reverse dip varnish were applied to a copper strip adjusting the varnish so that a film of varnish was deposited which was 1.9 to 2.1 mils in thickness. The copper specimen was aged at 135° C. until the varnish film cracked when the copper strip was bent around a 0.125 inch mandrel at room temperature.

*Table II*

| Varnish | 200° C. Twisted Pairs, hours | 200° C. Glass Cloth, hours | 135° C. Copper Strip, hours |
|---|---|---|---|
| Example 6 | 1,800 | 4,500 | 1,500 |
| Example 4 | 2,000 | 6,000 | 1,600 |
| Example 8 | 1,900 | 4,400 | 1,550 |
| Example 9 | 1,850 | 4,300 | 1,280 |
| Oil-modified Phenolic | 1,200 | 160 | 42 |
| Phthalic Anhydride Alkyd | 100 | 660 | 300 |

I claim:
1. An insulating varnish for electrical conductors including an alkyd resin selected from the group consisting of short oil-modified glyceryl isophthalate and short oil-modified glyceryl terephthalate, said resin having an oil length of 35 to 60, said oil being the sole modifier for said resin and also including an oil-soluble phenol-formaldehyde resin, said glyceryl being the sole alcoholic moiety in said alkyd resin, said phenol resin being a 100% phenol-formaldehyde resin which is the reaction product of formaldehyde and a phenol selected from the group consisting of ortho and para hydrocarbon substituted phenols, 2,2-bis(p-hydroxyphenyl) propane formaldehyde and mixtures thereof, the phenol-formaldehyde resin being present in amount of 80% to 15% of the total of the short oil alkyd resin and phenolic resin.

2. An insulating varnish according to claim 1 wherein the oil-modified alkyd resin is a semi-drying oil-modified alkyd resin.

3. An insulating varnish according to claim 2 wherein the oil-modified alkyd resin is a soybean oil-modified alkyd resin.

4. An insulating varnish according to claim 3 wherein 80% of the solids are the oil-modified alkyd resin and 20% are the phenol-formaldeyde resin.

5. An insulating varnish according to claim 4 wherein the phenol-formaldehyde resin is a p-tertiary butylphenol-formaldehyde resin.

6. An insulating varnish according to claim 4 wherein the phenol-formaldehyde resin is 2,2-bis(p-hydroxyphenyl)propane formaldehyde resin.

7. An insulating varnish including 20% to 85% of the solids, of an alkyd resin selected from the group consisting of soybean oil-modified glyceryl isophthalate and soybean oil-modified glyceryl terephthalate, said oil being the sole modifier for said resin and 80% to 15% of an oil-soluble p-tertiary butylphenol-formaldehyde resin, said glyceryl being the sole alcoholic moiety in said alkyd resin, said phenol resin being a 100% phenol-formaldehyde resin.

8. An electrical conductor coated with the cured mixture of the oil-modified alkyd resin and oil-soluble phenol-formaldehyde resin of claim 1.

9. An electrical conductor coated with the cured mixture of (1) an alkyd resin selected from the group consisting of soybean oil-modified glyceryl isophthalate and soybean oil-modified glyceryl terephthalate, said soybean oil being the sole modifier for said resin, said resin having an oil length of 35 to 60 and (2) an oil-soluble phenol-formaldehyde resin, said glyceryl being the sole alcoholic moiety in said alkyd resin, said phenol resin being a 100% phenol-formaldehyde resin which is the reaction product of formaldehyde and a phenol selected from the group consisting of ortho and para hydrocarbon substituted phenols, 2,2-bis(p-hydroxyphenyl) propane formaldehyde and mixtures thereof, the phenol-formaldehyde resin being present in amount of 80% to 15% of the total of the short oil alkyd resin and phenolic resin.

10. An electrical conductor according to claim 9 wherein the phenol-formaldehyde resin is a p-tertiary butyl-phenol-formaldehyde resin.

11. An insulating varnish for electrical conductors including an oil-modified glyceryl isophthalate resin, said resin having an oil length of 35 to 60, said oil being the sole modifier for said resin and an oil soluble phenol-formaldehyde resin, said glyceryl being the sole alcoholic moiety in said alkyd resin, said phenol resin being a 100% phenol-formaldehyde resin which is the reaction product of formaldehyde and a phenol selected from the group consisting of ortho and para hydrocarbon substituted phenols, 2,2-bis(p-hydroxyphenyl) propane formaldehyde and mixtures thereof, the phenol-formaldehyde resin being present in amount of 80% to 15% of the total of the short oil alkyd resin and phenolic resin.

12. An electrical conductor coated with the cured mixture of the oil-modified alkyd resin and oil soluble phenol-formaldehyde resin of claim 11.

References Cited in the file of this patent

UNITED STATES PATENTS

| | | |
|---|---|---|
| 2,046,318 | Brubaker | July 7, 1936 |
| 2,618,616 | Tess et al. | Nov. 18, 1952 |
| 2,686,739 | Kohl et al. | Aug. 17, 1954 |
| 2,686,740 | Goodwin | Aug. 17, 1954 |
| 2,687,396 | McLean | Aug. 24, 1954 |
| 2,687,398 | McLean | Aug. 24, 1954 |
| 2,857,344 | Walus | Oct. 21, 1958 |
| 2,884,390 | Carmody | Apr. 28, 1959 |
| 2,895,932 | Schlatter et al. | July 21, 1959 |
| 2,905,650 | Agens | Sept. 22, 1959 |

FOREIGN PATENTS

| | | |
|---|---|---|
| 414,665 | Great Britain | Aug. 7, 1934 |

OTHER REFERENCES

Payne: "Organic Coating Technology," vol. I, 1954, John Wiley and Sons, New York, pages 287 to 295.

Zhurnal Prikladnoi Khimii, vol. 29, pages 628–632.

Lum et al.: Ind. and Eng. Chem. 44, pages 1595–1600 (1952).

Paint, Oil & Chem. Rev., 116, No. 21, page 78 (1953).